United States Patent
Eberstein et al.

(10) Patent No.: US 11,473,990 B2
(45) Date of Patent: Oct. 18, 2022

(54) MEMBRANE WITH HIERARCHICALLY ARRANGED MICROMETER-SIZED AND SUB MICROMETER-SIZED UNITS, PRESSURE SENSOR SYSTEM WITH IMPROVED MEASUREMENT ACCURACY AND METHOD FOR PRODUCING SUCH A PRESSURE SENSOR SYSTEM

(71) Applicant: TDK Electronics AG, Munich (DE)

(72) Inventors: Markus Eberstein, Berlin (DE); Peter Sättler, Berlin (DE); Christian Wohlgemuth, Berlin (DE)

(73) Assignee: TDK ELECTRONICS AG, Munich (DE)

(*) Notice: Subject to any disclaimer, the term of this patent is extended or adjusted under 35 U.S.C. 154(b) by 4 days.

(21) Appl. No.: 17/273,679

(22) PCT Filed: Sep. 16, 2019

(86) PCT No.: PCT/EP2019/074716
§ 371 (c)(1),
(2) Date: Mar. 4, 2021

(87) PCT Pub. No.: WO2020/058197
PCT Pub. Date: Mar. 26, 2020

(65) Prior Publication Data
US 2021/0318192 A1 Oct. 14, 2021

(30) Foreign Application Priority Data
Sep. 19, 2018 (DE) .......................... 102018123023.0

(51) Int. Cl.
*G01L 9/00* (2006.01)
*G01L 19/06* (2006.01)
*G01L 23/24* (2006.01)

(52) U.S. Cl.
CPC .......... *G01L 9/0044* (2013.01); *G01L 9/0048* (2013.01); *G01L 19/0636* (2013.01); *G01L 19/0654* (2013.01); *G01L 23/24* (2013.01)

(58) Field of Classification Search
None
See application file for complete search history.

(56) References Cited

U.S. PATENT DOCUMENTS 6,435,025 B1   8/2002   Krause
6,941,814 B2   9/2005   Hegner et al.
(Continued)

FOREIGN PATENT DOCUMENTS

DE   10163567 A1   7/2003
DE   10334238 A1   2/2005
(Continued)

OTHER PUBLICATIONS

A. Aguilar-Moralesa, et al.: "Micro-fabrication of high aspect ratio periodic structures on stainless steel by picosecond direct laser interference patterning," Journal of Materials Processing Tech. vol. 252, pp. 313-321.

(Continued)

*Primary Examiner* — Lisa M Caputo
*Assistant Examiner* — Nigel H Plumb
(74) *Attorney, Agent, or Firm* — Slater Mastil, LLP

(57) ABSTRACT

In an embodiment a membrane includes a hydrophobic region having a plurality of hierarchically arranged micrometer-sized and submicrometer-sized units consisting of a membrane material, wherein a single micrometer-sized unit has a diameter of from 1 μm to 5 μm and a single submicrometer-sized unit has a diameter of <1 μm, and wherein the membrane is configured to be used in a pressure sensor system.

11 Claims, 2 Drawing Sheets

(56) References Cited

U.S. PATENT DOCUMENTS

| | | |
|---|---|---|
| 2006/0288774 A1 | 12/2006 | Jacob et al. |
| 2007/0209425 A1* | 9/2007 | Shibata .................. B01D 65/10 73/40 |
| 2008/0060440 A1* | 3/2008 | Toyoda ................. G01L 9/0054 73/756 |
| 2011/0086204 A1 | 4/2011 | Wohl, Jr. et al. |
| 2012/0240683 A1* | 9/2012 | Ooya .................. G01L 19/0681 73/706 |
| 2014/0061892 A1* | 3/2014 | Ziglioli .................. H04R 1/086 438/126 |
| 2017/0176311 A1* | 6/2017 | Kota ....................... G01N 13/02 |
| 2020/0255285 A1* | 8/2020 | Doering .................... B32B 3/30 |

FOREIGN PATENT DOCUMENTS

| | | |
|---|---|---|
| DE | 102008026611 A1 | 12/2009 |
| DE | 102014211856 A1 | 12/2015 |
| DE | 102014223984 A1 | 5/2016 |
| DE | 102017211451 A1 | 1/2019 |
| WO | 0214804 A1 | 2/2002 |

OTHER PUBLICATIONS

Bhishma R. Sedai, et al.: "Development of superhydrophobicity in fluorosilane-treated diatomaceous earth polymer coatings," Applied Surface Science, vol. 386, Nov. 15, 2016, pp. 178-186.

U. Hermens, et al.: "Mimicking lizard-like surface structures upon ultrashort laser pulse irradiation of inorganic materials" Applied Surface Science 418, Oct. 1, 2017, 2 pages.

D. H. Kam et al.: "Control of the wetting properties of an AISI 316L stainless steel surface by femtosecond laser-induced surfac modification," Journal of Micromechanics and Microengineering, vol. 22, Aug. 28, 2012, 7 pages.

* cited by examiner

MEMBRANE WITH HIERARCHICALLY ARRANGED MICROMETER-SIZED AND SUB MICROMETER-SIZED UNITS, PRESSURE SENSOR SYSTEM WITH IMPROVED MEASUREMENT ACCURACY AND METHOD FOR PRODUCING SUCH A PRESSURE SENSOR SYSTEM

This patent application is a national phase filing under section 371 of PCT/EP2019/074716, filed Sep. 16, 2019, which claims the priority of German patent application 102018123023.0, filed Sep. 19, 2018, each of which is incorporated herein by reference in its entirety.

TECHNICAL FIELD

The present invention relates to a membrane and to a pressure sensor system which has a membrane. The invention relates further to a method for producing the pressure sensor system.

BACKGROUND

Pressure sensors are widely used components for measuring absolute, relative and differential pressures in a large number of technical applications. In the automotive industry in particular, exact measurement of pressures by means of pressure sensors is essential. Thus, efficient exhaust gas purification by means of particle filters is achieved through the exact measurement of differential pressures in the exhaust gas system of diesel and Otto engines.

In order to meet the constantly increasing demands on exhaust gas purification, differential pressures on the exhaust gas system must be measured as quickly as possible, ideally directly after an engine cold start. This can lead to problems in particular in winter, since condensates that are contained in an exhaust gas can freeze. Frozen condensates can adhere directly to pressure-sensitive membranes of the pressure sensor or can accumulate in undercuts in a media supply line of the pressure sensor. This can lead to falsification of measurement signals or, in the worst case, as a result of expansion of the condensate on freezing, to damage to the pressure sensor.

Since the pressure-sensitive membranes in the pressure sensors serve to detect and/or transmit pressures that are generated by pressure-generating media, it is advantageous for a reliable pressure measurement, if the pressure-sensitive membranes are free of adhering condensates.

In particular, in order to free the pressure-sensitive membranes of frozen condensates, the pressure sensors are conventionally positioned at locations of the engine where the frozen condensates can thaw as a result of waste heat from the engine. However, since a certain temperature of the engine is necessary for this to occur, a certain time is required to reach that temperature. As a result, pressure measurement in the exhaust gas system directly after an engine cold start is not ensured.

It is further possible to heat the pressure sensor by means of an additional heating element. Although frozen condensates can thereby be thawed quickly and efficiently, an additional energy requirement required for heating the pressure sensor contradicts the idea of an energy-efficient and environmentally friendly vehicle.

SUMMARY

Embodiments provide a membrane which is suitable and intended for use in a pressure sensor system. Various embodiments provide a membrane free of frozen condensates which can otherwise be formed under certain conditions and without a heat supply. Further embodiments provide a pressure sensor system which comprises the membrane, and a method for producing the pressure sensor system.

A membrane which has a hydrophobic region is provided.

The term hydrophobic is used here and in the following to describe a region of the membrane in which, after application of a water droplet to the region, a contact angle between the water droplet and the region of more than 90° is measured.

Further a pressure sensor system is provided, which comprises a housing, at least one media supply line and a pressure-sensitive element, wherein the pressure-sensitive element has at least one membrane.

Further a method for producing a pressure sensor system is provided, which contains a membrane. This method includes providing a housing which has at least one media supply line, providing a sensor core, providing an inert oil, providing a membrane, producing a hydrophobic region on the membrane, producing a pressure-sensitive element from the sensor core, the inert oil and the membrane which has the hydrophobic region, and fixing the pressure-sensitive element in the housing by means of adhesive bonds in order to obtain a pressure sensor system.

The membrane can be configured in such a manner that the hydrophobic region is an entire outer surface of the membrane which is in direct contact with a pressure-generating medium. The pressure-generating medium can be, for example, an exhaust gas of an Otto or diesel engine.

The hydrophobic region on the membrane prevents condensates from forming on the membrane. Since therefore no condensates adhere to the membrane, condensates also cannot freeze on the membrane. As a result, the removal of frozen condensates by means of heating of the membrane by, for example, waste heat from the engine or an additional heating element becomes unnecessary. This makes it possible for pressure to be measured directly after an engine cold start without additional energy consumption. The hydrophobic region further prevents dirt from adhering to the membrane, whereby passive self-cleaning of the membrane is made possible.

The membrane of the pressure-sensitive element can further be configured in such a manner that the membrane is suitable and intended for use in a vertical orientation in a pressure sensor system. As a result of the vertical orientation of the membrane, the condensates can effectively run off from the membrane. This results in the reduction of measuring errors.

Furthermore, the media supply line of the pressure sensor system can have a critical surface which is configured in such a manner that:

the critical surface encloses with a notional, horizontal auxiliary surface an angle of depression $\beta$, for which there applies: $0° < \beta \leq 90°$, and the critical surface does not form any undercuts.

Here and in the following, critical surfaces refer to surfaces on which condensates may accumulate under the influence of gravity, which, upon freezing, can lead to the pressure-sensitive element of the pressure sensor system being impaired or damaged.

By configuring the critical surface in such a manner that it is inclined at the angle of depression $\beta$ and does not form any undercuts, the condensates are able to run off efficiently under the influence of gravity. As a result, measuring errors and a risk of damage to the pressure-sensitive element by freezing condensates are reduced.

The pressure-sensitive element of the pressure sensor system can further be fixed in the housing by means of adhesive bonds which consist of a media-resistant adhesive.

A media-resistant adhesive is an adhesive which does not change its properties, in particular its adhesive effect, under the influence of the pressure-generating medium. This ensures that adhesive bonds do not dissolve under the influence of the pressure-generating medium. In particular, this is important for the measurement of differential pressures in the exhaust gas line of Otto and diesel engines, since the exhaust gases in most cases also contain aggressive substances such as acids, which may otherwise lead to damage to the adhesive bonds.

By the use of adhesive bonds, other fixing means and seals for the pressure-sensitive element, such as O-rings or metal connection pieces, can be dispensed with. As a result, it is possible to configure the pressure sensor system in such a manner that the critical surface, which is inclined at an angle of depression β and does not form any undercuts, is directly in contact with the pressure-sensitive element. This has the result that no surfaces that allow condensates to accumulate directly on the pressure-sensitive element are in direct contact with the pressure-sensitive element.

The membrane of the pressure sensor system can further have a diameter which is a diameter of the media supply line of the pressure sensor system. The diameter of the membrane is determined by the diameter of the part of the media supply line that is in direct contact with the pressure-sensitive element. As a result, it is possible for further components of the pressure-sensitive element, such as, for example, welding rings, which may act as collecting points for condensates, to be integrated into the housing of the pressure sensor system.

The membrane of the pressure sensor system can further consist of a membrane material which is selected from a group comprising metals and silicon. In particular the use of stainless steel as the membrane material leads, compared to other membrane materials, to an improvement in the resistance of the pressure-sensitive element to aggressive media such as acids.

Furthermore, the hydrophobic region of the membrane of the pressure sensor system can consist of an additional hydrophobic layer which contains a hydrophobic material. In particular, the additional hydrophobic layer can contain fluorosilanes.

The hydrophobic region of the membrane of the pressure sensor system can further have a plurality of hierarchically arranged micrometer-sized and submicrometer-sized units which consist of the membrane material. Single micrometer-sized units can have a diameter of from 1 µm to 5 µm. Single submicrometer-sized units can have a diameter of <1 µm. The term hierarchical here means that a plurality of submicrometer-sized units is formed on the micrometer-sized units, which are formed directly on a region of the membrane according to the invention that is to become the hydrophobic region. By means of an arrangement of a plurality of such hierarchically arranged micrometer-sized and submicrometer-sized units, the hydrophobic region that effectively prevents condensates from adhering to the membrane is produced.

The hydrophobic region of the membrane can be produced by coating a region of the membrane that is to become the hydrophobic region with an additional hydrophobic layer which contains a hydrophobic material.

The hydrophobic region of the membrane can further be produced by heat treatment of a region of the membrane that is to become the hydrophobic region. The heat treatment thereby takes place in a medium which is selected from a set which contains at least air, reactive gases, reactive solutions and plasma.

Here and in the following, the term reactive refers to gases and solutions which are suitable for changing a non-hydrophobic region of the membrane by means of chemical reactions in such a manner that the region becomes hydrophobic.

BRIEF DESCRIPTION OF THE DRAWINGS

A pressure-sensitive element which has a membrane with a hydrophobic region, and a pressure sensor element are described herein below with reference to schematic figures.

DETAILED DESCRIPTION OF ILLUSTRATIVE EMBODIMENTS

Figure 1:
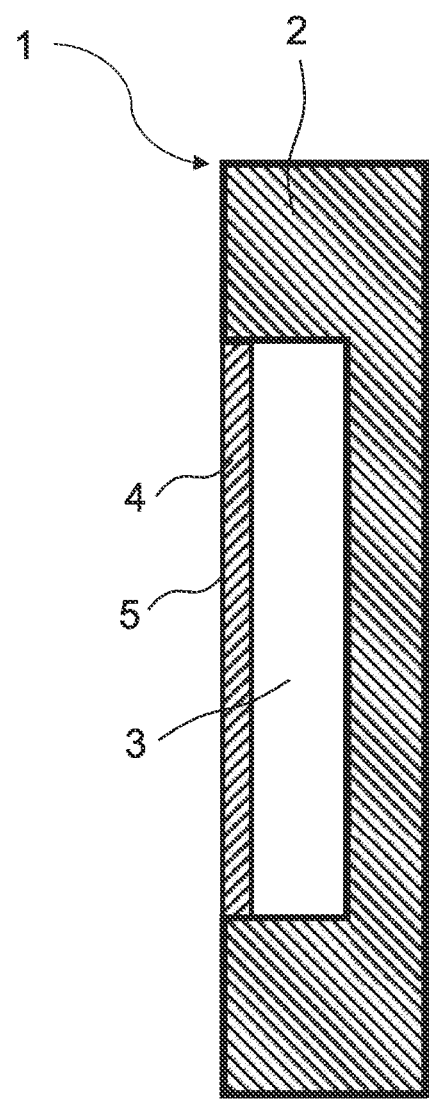
FIG. 1 shows a section of a pressure-sensitive element in cross-section.

FIG. 1 shows, in cross-section, a section of a pressure-sensitive element 1. The pressure-sensitive element 1 comprises a sensor core 2 which has a recess 3 which is covered with a membrane 4 of stainless steel. The sensor core 2 has all the necessary components, such as a measuring element and signal converter, for converting pressures generated by a pressure-generating medium into a standardized output signal. Furthermore, the sensor core also comprises fixing means for the membrane 4. The recess 3 of the sensor core 2 is filled with an inert oil. The inert oil protects the sensor core 2 from being damaged by the pressure-generating medium. Pressures which are exerted on the membrane 4 are transmitted directly to the measuring element via the inert oil, which is not compressible. The measuring element in turn generates a signal, which is converted by means of the signal converter into a standardized output signal.

Furthermore, the membrane 4 has a hydrophobic region 5, which is formed on an entire outer surface of the membrane 4 which is exposed to the pressure-generating medium. By the formation of the hydrophobic region 5 on the membrane 4, condensates contained in the pressure-generating medium are largely prevented from adhering to the membrane 4. As a result, impairment of or damage to the pressure-sensitive element 1 by the condensates, which can freeze, is avoided efficiently.

Figure 2:
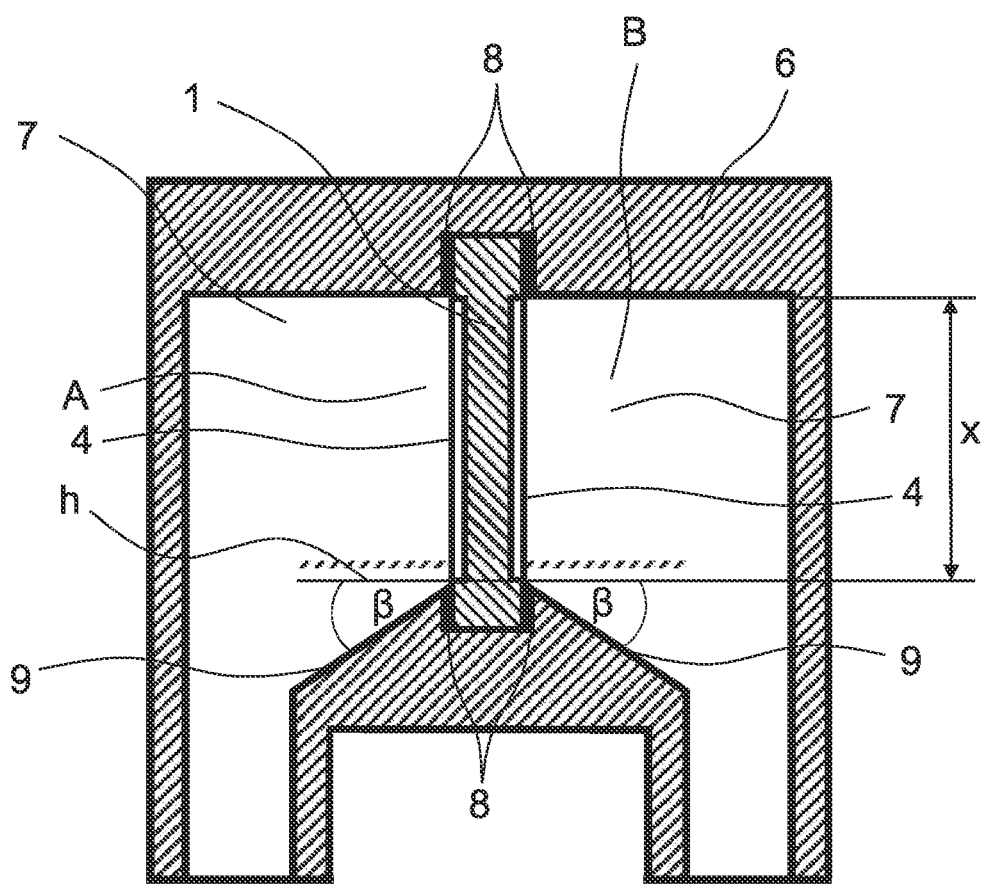
FIG. 2 shows a pressure sensor system in cross-section.

FIG. 2 shows, in cross-section, a pressure sensor system. The pressure sensor system comprises a housing 6, two media supply lines 7 and a pressure-sensitive element 1, similar to that described in FIG. 1. The pressure-sensitive element 1 has two membranes 4, which are oriented vertically and which are located on two opposite sides of the pressure-sensitive element 1. Furthermore, the two membranes 4 each have a diameter which is the diameter x of the part of the media supply lines 7 that is in direct contact with the pressure-sensitive element 1 by means of the adhesive bonds 8. This makes it possible for further components of the pressure-sensitive element 1, such as welding rings, to be integrated into the housing 6, whereby surfaces on which condensates can accumulate are reduced.

The pressure-sensitive element 1 is fixed in the housing 6 via adhesive bonds 8. This enables direct contact of the critical surfaces 9 of the media supply lines 7 with the pressure-sensitive element 1. Furthermore, the critical surfaces 9 are configured in such a manner that they are inclined at an angle of depression β, which is spanned by the respective critical surface 9 and a horizontal auxiliary surface h, and do not form any undercuts. This, in conjunction with the vertical orientation of the membrane 4, enables efficient drainage of the condensates. As a result, impairment of or even damage to the pressure-sensitive element 1 by the condensates, which can freeze, can largely be avoided.

The construction of the pressure sensor system shown here comprises a first chamber A and a second chamber B, which are separated from one another by the pressure-sensitive element 1. This construction allows differential pressures to be measured. In particular, it is possible to measure differential pressures in the exhaust gas system of an Otto or diesel engine. An exhaust gas pressure is thereby determined before entry into a particle filter, for example into chamber A, and an exhaust gas pressure is determined after leaving the particle filter, for example in chamber B. The difference between the two exhaust gas pressures gives the differential pressure, which allows conclusions to be drawn about a degree of contamination of a particle filter.

The membrane, the pressure sensor system and the method for producing a pressure sensor system are not limited to the described features. Furthermore, embodiments of the pressure sensor system which are suitable for measuring relative pressures and absolute pressures are also possible.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A membrane comprising:
   a hydrophobic region,
   wherein the hydrophobic region of the membrane has a plurality of hierarchically arranged micrometer-sized and submicrometer-sized units consisting of a membrane material,
   wherein a single micrometer-sized unit has a diameter of from 1 μm to 5 μm and a single submicrometer-sized unit has a diameter of <1 μm,
   wherein the submicrometer-sized units are directly arranged on the micrometer-sized units, and
   wherein the membrane is configured to be used in a pressure sensor system.

2. A pressure sensor system comprising:
   a housing;
   at least one media supply line; and
   a pressure-sensitive element comprising at least one membrane with a hydrophobic region,
   wherein the hydrophobic region of the membrane has a plurality of hierarchically arranged micrometer-sized and submicrometer-sized units consisting of a membrane material,
   wherein a single micrometer-sized unit has a diameter of from 1 μm to 5 μm and a single submicrometer-sized unit has a diameter of <1 μm,
   wherein the submicrometer-sized units are directly arranged on the micrometer-sized units.

3. The pressure sensor system according to claim 2, wherein the membrane is suitable to be used in a vertical orientation in the pressure sensor system.

4. The pressure sensor system according to claim 2,
   wherein the media supply line has a critical surface,
   wherein the critical surface encloses with a horizontal auxiliary surface an angle of depression β with $0°<β≤90°$, and
   wherein the critical surface does not form any undercuts.

5. The pressure sensor system according to claim 2, wherein the pressure-sensitive element is fixed in the housing by adhesive bonds comprising a media-resistant adhesive.

6. The pressure sensor system according to claim 2, wherein the membrane has a diameter which is a diameter of a part of the media supply line that is in direct contact with the pressure-sensitive element.

7. The pressure sensor system according to claim 2, wherein the membrane material is selected from the group consisting of metals and silicon.

8. The pressure sensor system according to claim 2, wherein the hydrophobic region of the membrane consisting of an additional hydrophobic layer containing a hydrophobic material selected from fluorosilanes.

9. A method for producing a pressure sensor system, the method comprising:
   providing a housing comprising at least one media supply line;
   providing a sensor core;
   providing an inert oil;
   providing a membrane;
   producing a hydrophobic region on the membrane;
   producing a pressure-sensitive element from the sensor core, the inert oil and the membrane with the hydrophobic region; and
   fixing the pressure-sensitive element in the housing by adhesive bonds in order to obtain the pressure sensor system,
   wherein the hydrophobic region of the membrane has a plurality of hierarchically arranged micrometer-sized and submicrometer-sized units consisting of a membrane material,
   wherein a single micrometer-sized unit has a diameter of from 1 μm to 5 μm and a single submicrometer-sized unit has a diameter of <1 μm, and
   wherein the submicrometer-sized units are directly arranged on the micrometer-sized units.

10. The method according to claim 9, wherein the hydrophobic region of the membrane is produced in such that a non-hydrophobic region of the membrane that is to become the hydrophobic region is coated with an additional hydrophobic layer.

11. The method according to claim 9, wherein the hydrophobic region of the membrane is produced by a heat treatment of a non-hydrophobic region of the membrane that is to become the hydrophobic region, and wherein the heat treatment is performed in a medium which is selected from a mass comprising air, reactive gases, reactive solutions and plasma.

* * * * *